United States Patent Office 3,510,318
Patented May 5, 1970

3,510,318
METHOD OF SMOKING AND COOKING STOCKINETTE ENCLOSED MEAT
Wilfried A. Kernbach, Rochelle Park, N.J., assignor to Baxter Laboratories, Inc., Morton Grove, Ill., a corporation of Delaware
No Drawing. Filed Dec. 1, 1966, Ser. No. 598,210
Int. Cl. A23b 1/04, 3/04
U.S. Cl. 99—229                           2 Claims

ABSTRACT OF THE DISCLOSURE

An improved carrier for meat and meat products during smoking and cooking consisting of a textile fabric stockinette coated with enzyme sufficient to substantially reduce the adherence of the stockinette to the meat.

---

This invention relates to an improved stockinette for use in the treatment of meat and meat products. More particularly, this invention relates to the use of enzymes for impregnating, coating, or similarly treating a stockinette or the textile fabric used in making a stockinette to prevent the adherence of the stockinette to the meat during smoking and cooking operations.

In the production of certain meat products, notably smoked hams and picnics, the cured meat is placed in an open-mesh stockinette made of textile fabric which is used to carry the meat while it is suspended from overhead racks in the smokehouse. The open-mesh stockinette assists in compressing the meat and giving it a desired compact appearance, while at the same time it allows the smoke to readily contact the meat. While hanging in these stockinettes, during this smoking and cooking process, however, the fabric of the stockinette undesirably tends to become firmly encrusted onto the meat surface. Consequently, the process of removing the stockinette from the meat after processing causes tearing of the meat surface and frequently the ripping of whole chunks of meat from the product. Also, particles of the fabric tend to remain on the meat, thereby giving the meat an undesirable, fuzzy appearance.

It has been previously suggested to treat stockinettes with oleo oil to reduce the tendency of adherence to the meat. Such procedure is disclosed in Covey, U.S. Patent 1,790,698. An improved blend of oleo oil and lecithin is presently commercially marketed for such use. This blend is not completely satisfactory, however, because the lecithin is known to cause troublesome cracks in the skin of the meat handlers.

Other procedures which have been used to reduce the adherence of meat to the stockinette consist of showering the meat with warm water or allowing the meat to hang for several days in a refrigerator. Neither of these other procedures provides a completely satisfactory solution to the problem of adherence since the showering with water tends to increase the microbial content of the meat product and to remove surface smoke flavor of the meat, and prolonged storage by refrigeration causes loss of meat sales weight as a result of dehydration of the meat.

An object of the present invention is to provide an improved method of substantially reducing or eliminating the tendency of meat and meat products to adhere to the stockinette after smoking and cooking operations.

Another object of the present invention is to provide a stockinette textile fabric which is improved through treatment by novel means to prevent the adherence thereto of meat and meat products carried in the stockinette during smoking and cooking operations.

In accordance with the present invention, the stockinette or the textile fabric used in making the stockinette is impregnated or coated with an aqueous solution or suspension of enzyme sufficient to substantially eliminate adherence of the meat or meat products to the stockinette during smoking and cooking operations.

As used herein, the term "stockinette" refers to a bag or tube made of cellulose-based fibers or of other fabrics, woven in a net-like fashion with an open-mesh structure of variable sizes, so as to hold and to form the meat while allowing free access of smoke to the meat surface. Depending upon whether stronger forming pressures are desired for better yields or improved smoke penetration for better color and flavor, a distinction is made between, respectively, "rib knit" and "flat knit" bags or tubes.

Cotton is the preferred fiber for use in making the stockinette, although various other fibers and fabrics, both natural and synthetic, for example, jute, rayon, wool, nylon, "Dacron," "Mylar," paper and the like materials are also included within the scope of this invention.

Examples of enzymes which can be used in the practice of this invention are papain, bromelain, ficin, pancreatin, and other proteolytic enzymes, for example, proteases derived from microbial sources, such as those produced by *Bacillus subtilis, Aspergillus oryzae, Aspergillus niger,* and the like microbes, and various other enzymes derived from plant, animal, fungal and bacterial sources. Papain, which is extracted from the papaw tree (*Carica papaya* L.), is the preferred enzyme for use in this invention. The enzymes should be edible and preferably stable at the temperatures normally encountered in smoking, i.e., up to about 180° F.

The enzymes used for impregnating or coating the stockinette or the stockinette fabric can vary from very crude preparations to highly purified preparations of the enzyme. Various methods of purification of the enzyme can be used. In the case of papain, for example, ordinary solvent fractionation procedures or other methods such as those described by Cayle, U.S. Patent 3,075,886, can be used to purify the enzymes. Also in the case of papain, the enzyme can be extracted from the usual fruit portions of the papaw tree or from the non-fruit portions such as described by Cayle, U.S. Patent 3,210,257.

In general, it has been found that soaking the stockinette or the fabric used in making the stockinette in an aqueous enzyme solution having an enzyme activity equivalent to one pound of "Tona 14" in quantities of cold water of from about one to about twelve gallons strength is sufficient to substantially reduce or eliminate the adherence between the fabric and the meat. Higher and lower dilutions of enzyme may also be used, depending upon the amount of leaching out of enzyme during cooking-drain of pickle from product. It will be understood that the amount of enzyme used will also depend in part upon the particular fabric used in the stockinette and upon the particular meat product being processed or its method of handling. For example, if the meat is exposed to very high temperatures during processing, consequent enzyme activation may require the use of very high levels of enzyme to produce the desired effect. In other cases, the sticking problem may be minimal or the heat treatment may be moderate, in which case relatively dilute solutions of enzyme may be sufficient to prevent adherence between the fabric and the meat.

The "Tona 14" referred to herein is a commercially-available papain enzyme composition having an assay of 2 milk clotting units of activity per gram. All enzyme unitages are expressed herein on a dry weight basis. The milk clotting assay method used herein is the method of Balls and Hoover, J. Biol. Chem., vol. 121, p. 737 (1937), as modified by Hinkel and Alford, Ann. N.Y. Acad. Sci., vol. 54, p. 211 (1951) and described in detail by Silberstein, U.S. Patent 3,276,879. Enzymes other than papain will have various other enzyme unitages depending upon the method of assay.

It will also be understood that the enzyme material used herein to impregnate or coat the stockinette or the stockinette fabric can contain other substances which do not prevent the enzyme from serving its purpose to reduce or eliminate adherence of the meat to the stockinette. For example, small amounts of salt, sugar, phosphate, spices, nitrate, nitrite, monosodium glutamate, hydrolyzed plant protein, and the like materials can be present in the enzyme material used to impregnate the stockinette.

According to another aspect of the invention, the enzyme is combined, for application to the stockinette, with a coating or other substance which is compatible with the enzyme and which helps to retain the enzyme in contact with the stockinette during the processing of the meat. The coating helps to prevent the "leaching out" of the enzyme from the stockinette by juices running from the meat while the meat is hanging from the overhead racks in the smokehouse or during other such meat processing. Suitable materials for this purpose are edible animal fats and hardened vegetable oils, for example animal fats such as lard and tallow and hardened vegetable oils such as hardened soy bean and cotton seed oils having iodine values less than about 75. Other suitable materials for this purpose are edible lipid derivatives such as the hardened mono- and diglycerides containing long chain fatty acid groups having from about 14 to about 22 carbon atoms and the acetylated derivatives of said mono- and diglycerides. Higher carbon-chain waxy lipids and lipid derivatives and various other hydrophobic materials in general are also suitable to prevent or substantially reduce leaching of the enzyme from the stockinette.

The following example is illustrated of the present invention although it will be understood that the invention is not limited to this specific example.

Example

A papain enzyme preparation ("Tona 14") having a milk clotting assay of 2 units of activity per gram was dissolved in cold water at five different concentrations, namely one pound of enzyme in one, two, four, eight and twelve gallons of water. In each sample thus prepared, a stockinette was soaked until thoroughly wet and then wrung out to remove the excess solution. A cured ham was then stuffed into each of the stockinettes. The stockinettes were then tied with a knot and hung from an iron rack called a "smoke-tree." The smoke-tree was then placed into a preheated smokehouse together with other commercial hams of similar size and weight and processed in the usual manner by drying for 2 to 4 hours at temperatures between 125° F. and 130° F. and then smoking and cooking the hams for eighteen hours until a minimum temperature of 148° F. inside the hams was reached. This is the approved method for manufacturing fully cooked hams. Subsequently, the hams were chilled to 45° F. inside temperature and moved into the packing room. The stockinettes were then stripped off the hams. It was found that the stockinettes could be readily stripped off the hams without breaking of the surface of the ham. By way of comparison, stockinettes which were used to carry ham during similar meat processing as above but which were not treated with enzyme, adhered to the meat surface, resulting in substantial tearing of the meat when the stockinette was stripped from the meat.

Equivalent amounts of bromelain, ficin, pancreatin and microbial protease derived from *Bacillus subtilis* can be substituted for the papain in the above example with substantially comparable improvement in eliminating adherence between the stockinette and the ham during smoking and cooking.

In the above example, leaching of enzyme during hanging of the meat from the "smoke-tree" can be reduced by coating the stockinette with tallow.

As will be readily apparent to those skilled in the art, after reading the foregoing specification and the claims annexed hereto, other examples of the herein-defined invention can be devised by various modifications, variations and adaptations without departing from the spirit and scope of the invention. All such modifications, variations and adaptations are included within the scope of the invention as defined in the appended claims.

What is claimed is:

1. In the method of smoking and cooking stockinette enclosed meat, the improvement comprising prior to said smoking and cooking of said meat in said stockinette impregnating or coating the stockinette or the textile fabric used in making the stockinette with an aqueous solution or suspension of an edible proteolytic enzyme sufficient to substantially reduce the adherence of the stockinette to the meat subsequent to smoking and cooking the meat.

2. The method of claim 1 in which the enzyme is combined with a hydrophobic material to substantially reduce leaching of the enzyme.

References Cited

UNITED STATES PATENTS

| 2,072,955 | 3/1937 | Lunt | 99—174 X |
| 2,811,454 | 10/1957 | Pressman | 99—174 X |
| 2,382,660 | 5/1961 | Brissey et al. | 99—187 X |

HYMAN LORD, Primary Examiner

U.S. Cl. X.R.

99—107